May 26, 1931.  R. TARSHIS  1,807,353
HELICOPTER
Original Filed Oct. 10, 1928
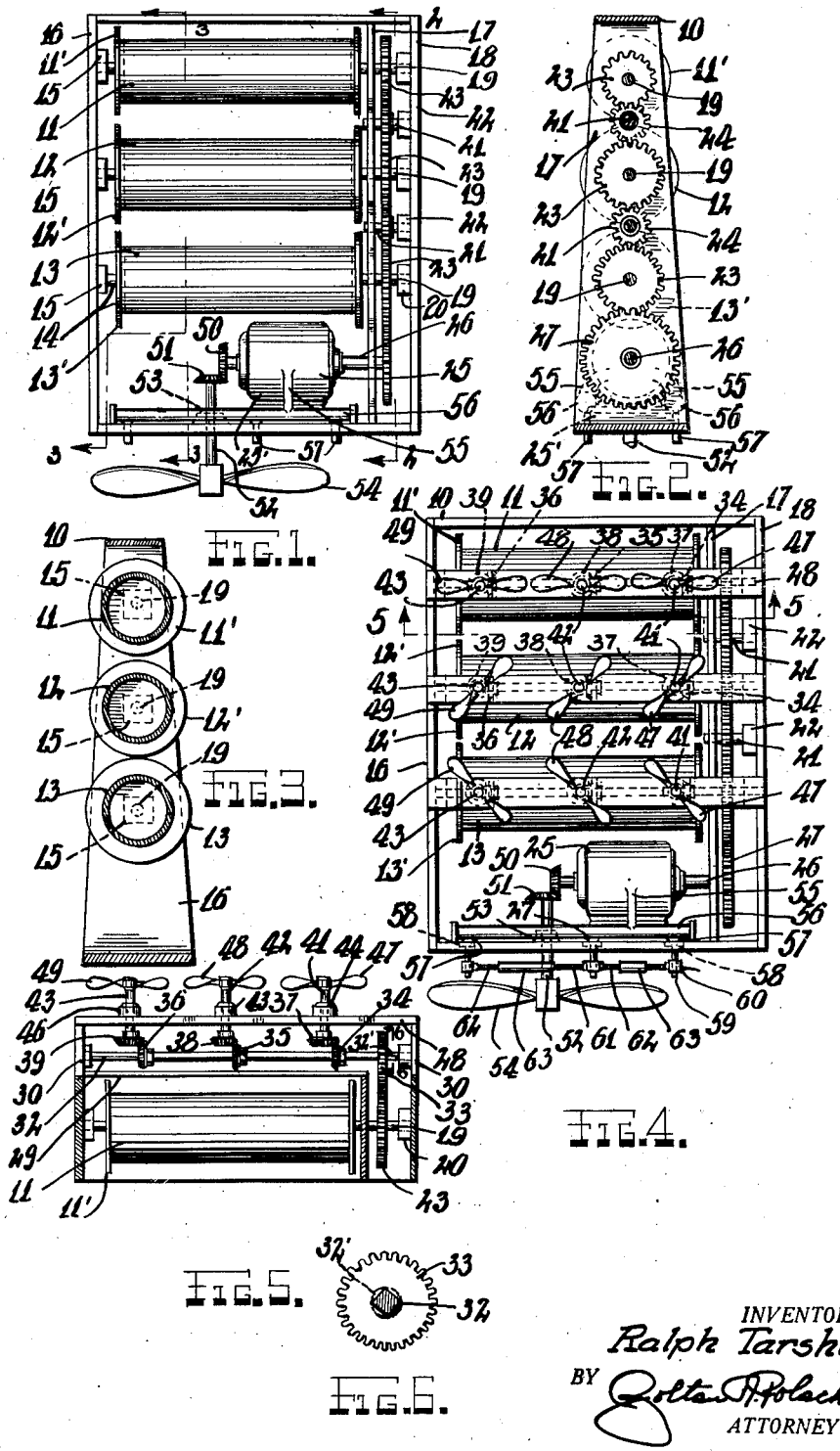
INVENTOR.
Ralph Tarshis
BY
ATTORNEY Patented May 26, 1931

1,807,353

UNITED STATES PATENT OFFICE

RALPH TARSHIS, OF BROOKLYN, NEW YORK

HELICOPTER

Refile for abandoned application Serial No. 311,448, filed October 10, 1928. This application filed January 23, 1930. Serial No. 422,969.

This invention relates to improvements in helicopters and has for its object the provision of a simplified device for resisting the powers of gravity.

This invention is directed to subject matter similar to that disclosed in my Patent No. 1,681,067 for helicopter and dated August 14, 1928. The present application is a refiled application of an abandoned application filed by me on October 10, 1928, Serial No. 311,448.

A further object of my invention is the provision of a device of the character which may be directionally controlled to resist wind thus rendering the device capable of making a vertical ascent.

In the drawings—

Fig. 1 is an elevational view of my invention in the position in which it is adapted to ascend.

Fig. 2 is a longitudinal sectional view taken on line 2—2 of Fig. 1.

Fig. 3 is a longitudinal sectional view taken on line 3—3 of Fig. 1.

Fig. 4 is an elevational view of a further development of my invention.

Fig. 5 is a transverse sectional view taken on line 5—5 of Fig. 4.

Fig. 6 is a fragmentary enlarged sectional view taken on line 6—6 of Fig. 5.

Referring particularly to Fig. 1 of the drawings, the numeral 10 designates a frame of rectangular shape in which three hollow drums 11, 12 and 13 are rotatively mounted in horizontal alignment. Flanges 11′, 12′ and 13′ tend to keep the air away from the vacuum created by drums 11, 12 and 13, respectively, above the periphery of the said rotary drums. Stud shafts 14 are mounted rigidly on the left end of the drums 11, 12 and 13 and are rotatively journaled in bearing members 15, mounted in the left side 16 of the frame 10. A vertically extending partition 17 is disposed in the frame 10 in spaced relation to the right side 18 of the said frame. Shafts 19 are rigidly attached to the right ends of the drums 11, 12 and 13, and are disposed through apertures in the partition 17 and journaled at their outer extremities in bearings 20 on the side 18 of the frame.

Two short shafts 21 are journaled at their outer ends in bearings 22 on the side 18 of the frame 10 and are journaled at their other end portions in apertures in the partition 17. The shafts 21 are equally spaced between the shafts 19 of the adjacent rollers. Gears 23 are rigidly mounted on the shafts 19 of the drums 11, 12 and 13 and are meshed with idler gears 24 mounted on the shafts 21. The gears 24 are disposed between each of the gears 23 of the drums for the purpose of causing the rotation of all the drums to be in one and the same direction.

A gasoline engine 25 is mounted on the base 25′ of the frame 10 and is provided with a shaft 26 having a pinion 27 thereon in mesh with the lowermost gear 23.

The engine shaft 26 is provided with a second pinion 50 meshing with a bevel gear 51 fixed on a vertical shaft 52 rotatively mounted in the frame 10 by engaging a thrust bearing 53, and a helicopter propeller 54 is fixed on the lower end of the shaft 52. This propeller forces the machine upwards. The engine 25 is of the type having exhaust pipes 55 discharging exhaust gas. Pipes 56 connect with the pipes 55, and have a plurality of downwardly directed nozzles 57. Exhaust gas discharging from these nozzles forces the machine upwards. It is pointed out that upon a proper regulation of the speed of the engine 25, the machine can maintain various speeds in the air during flight.

In the modified form of my invention shown in Figs. 4 and 5 the frame 10 is provided with three pairs of laterally disposed cleats 28 and 29, both cleats being positioned in superimposed relation adjacent the drums and spaced apart by blocks 30 mounted on the sides of the frame 10. The cleat 29 extends from one side of the frame 10 to the partition 17 and the cleat 28 extends from side to side of the frame. A shaft 32 is journaled at its extremities in the blocks 30 and extends laterally across the frame. The shaft 32 is provided with a square section 32′ upon which is slidably mounted a gear 33 meshed with the gear 23 of the drum 11. Bevel gears 34, 35 and 36 are mounted on the shaft 32 and are meshed with bevel gears 37, 38 and 39, respectively, mounted on shafts 41, 42 and 43, respectively. The shafts 41, 42 and 43 are journaled in bearing members 44, 45 and 46, mounted on the outer cleat 28 and the outer extremities of the shafts 41, 42 and 43 are provided with propeller members 47, 48 and 49, respectively.

It should be understood that the propellers may be rotated when the drums are rotated by an operative driving connection between the gear 23 and the gear 33, the latter gear being slidably mounted on the square section 32' of the shaft 32 so as to be able to be moved into and out of mesh with the gear 23 as desired. It should also be understood that each drum is provided with a set of three propellers mounted and operatively connected to the driving mechanism as described above.

The nozzles 57 are provided with end couplings 58 engaging flexible exhausts 59. Collars 60 are fixed on the exhaust 59, and rods 61 and 62 are disposed between the collars and project towards each other. The rods 61 are formed with right hand threads, and rods 62 with left hand threads, and tubular connectors 63 threadedly engage these rods. The connectors 63 may be rotated for changing the distances between the flexible exhausts 59 for causing them to bend and thus changing their directions of discharge from truly vertical to slight inclinations. It will be found that the operation of the exhausts are more efficient in slightly inclined positions.

It should be understood that rockets and superheated steam may be also used for forcing the machine upwards.

In the operation of my invention the propellers 47, 48 and 49 when rotated produce a current of air which is directed against the drums 11, 12 and 13, substantially at right angles thereto. If there is a natural current of air in motion, then the device is so positioned so as to have the natural current of air combined with the artificial current of air produced by the propeller. When there is a sufficiently strong natural current of air the artificial current is not necessary and if desired the propellers may be rendered inoperative by disengaging the gears 23 and 33 as above set forth. The hollow cylinders or drums rotate at a very high speed preferably 200 R. P. M. and the rotation of the propellers may be predetermined by the selection of suitable gears. The resultant of the air forces set up around the drums and the perpendicular force developed by the propellers is an upward force which tends to urge the device upwardly against the force of gravity.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A helicopter of the class described, comprising a frame, spaced hollow cylinders rotatively mounted therein, an engine with an exhaust pipe discharging exhaust gas and connected for driving the cylinders in one direction, a pipe connected with the said exhaust pipe, and provided with a plurality of downwardly directed nozzles for forcing the helicopter upwards into the vacuum created by the said cylinders.

2. A helicopter of the class described, comprising a frame, spaced hollow cylinders rotatively mounted therein, a motor with an exhaust pipe discharging exhaust gas, and connected for driving the cylinders in one direction, a pipe connected with the said exhaust pipe, and provided with a plurality of downwardly directed nozzles for forcing the helicopter upwards into the vacuum created by the said cylinders, and a helicopter propeller arranged at the bottom of the machine and driven by the said motor for aiding in forcing the helicopter upwards into the said vacuum.

3. A helicopter of the class described, comprising a frame, spaced hollow cylinders rotatively mounted therein, a motor with an exhaust pipe discharging exhaust gas, and connected for driving the cylinders in one direction, a pipe connected with the said exhaust pipe, and provided with a plurality of downwardly directed nozzles for forcing the helicopter upwards into the vacuum created by the said cylinders, and a helicopter propeller arranged at the bottom of the machine and driven by the said motor for aiding in forcing the helicopter upwards into the said vacuum, the helicopter propeller being rotatively mounted in a thrust bearing mounted in the said frame.

4. A helicopter of the class described, comprising a frame, spaced hollow cylinders rotatively mounted therein, a motor with an exhaust pipe discharging exhaust gas, and connected for driving the cylinders in one direction, a pipe connected with the said exhaust pipe, and provided with a plurality of nozzles for forcing the helicopter upwards into the vacuum created by the said cylinders.

5. A helicopter of the class described, comprising a frame, spaced hollow cylinders rotatively mounted therein, a motor with an exhaust pipe discharging exhaust gas, and connected for driving the cylinders in one direction, a pipe connected with the said exhaust pipe, and provided with a downwardly directed nozzle for forcing the helicopter upwards into the vacuum created by the said cylinders.

6. A helicopter of the class described, comprising a frame, spaced hollow cylinders rotatively mounted therein, a motor with an exhaust pipe discharging exhaust gas, and connected for driving the cylinders in one direction, a pipe connected with the said exhaust pipe, and provided with a plurality of downwardly directed nozzles for forcing the helicopter upwards into the vacuum created by the said cylinders, and flexible exhausts connected with the nozzles and arranged for assuming angular positions.

In testimony whereof I have affixed my signature.

RALPH TARSHIS.